United States Patent
Kamura et al.

[11] Patent Number: 5,975,047
[45] Date of Patent: Nov. 2, 1999

[54] CONTROL APPARATUS FOR AN IN-CYLINDER INJECTION SPARK-IGNITION INTERNAL COMBUSTION ENGINE

[75] Inventors: Hitoshi Kamura; Kenjiro Hatayama, both of Kyoto; Hiroki Tamura, Aichi, all of Japan

[73] Assignee: Mitsubishi Jidosha Kogyo Kabushiki Kaisha, Tokyo, Japan

[21] Appl. No.: 08/917,499

[22] Filed: Aug. 26, 1997

[30] Foreign Application Priority Data

Aug. 26, 1996 [JP] Japan .................................. 8-224134

[51] Int. Cl.$^6$ ............................ F02P 5/145; F02P 17/00
[52] U.S. Cl. ...................................... 123/305; 123/406.47
[58] Field of Search .......................... 123/305, 406.47, 123/295

[56] References Cited

U.S. PATENT DOCUMENTS

| | | | |
|---|---|---|---|
| 5,067,459 | 11/1991 | Ma | 123/295 |
| 5,640,939 | 6/1997 | Shimada et al. | 123/406.47 |
| 5,749,334 | 5/1998 | Oda et al. | 123/305 |
| 5,778,856 | 7/1998 | Okada et al. | 123/406.47 |
| 5,819,701 | 10/1998 | Morikawa | 123/406.47 |

*Primary Examiner*—Erick R. Solis

[57] ABSTRACT

A control apparatus for an in-cylinder injection spark-ignition internal combustion engine, which includes a fuel injection valve for injecting a fuel directly into a combustion chamber and a spark plug for subjecting the fuel to spark ignition in the combustion chamber, and operates in an intake-stroke injection mode where the fuel is injected mainly in an intake stroke or a compression-stroke injection mode where the fuel is injected mainly in a compression stroke, comprises load correlation value calculation means for calculating a load correlation value of the internal combustion engine, ignition timing setting means for setting a reference ignition timing for the spark plug in accordance with the fuel injection mode and the load correlation value, and correction means for correcting the reference ignition timing in accordance with the operating state, the control apparatus further comprising correction limiting means for limiting the correction when the fuel injection mode is the compression-stroke injection mode.

8 Claims, 7 Drawing Sheets

CONTROL APPARATUS FOR AN IN-CYLINDER INJECTION SPARK-IGNITION INTERNAL COMBUSTION ENGINE

BACKGROUND OF THE INVENTION

1. Field of the Invention

The present invention relates to a control apparatus for an in-cylinder injection spark-ignition internal combustion engine capable of fuel injection in a compression stroke and an intake stroke.

2. Description of the Related Art

In order to reduce harmful gas components discharged from spark-ignition internal combustion engines that are mounted in vehicles, or improve the fuel-efficiency of the engines, there have recently been proposed various gasoline engines of an in-cylinder injection type in which fuel is injected directly into a combustion chamber, in place of conventional manifold-injection engines.

In an in-cylinder injection gasoline engine, an air-fuel mixture with an air-fuel ratio near a stoichiometric air-fuel ratio is generated around a spark plug at the time of ignition by, for example, injecting fuel from a fuel injection valve into a cavity that is formed in the top face of a piston. Thus, the fuel can be ignited with use of a generally lean air-fuel ratio, so that the discharge amounts of carbon monoxide (CO) and hydrocarbon (HC) are reduced, and the fuel-efficiency for idle operation or low-load drive can be improved considerably.

In the in-cylinder injection gasoline engine of this type, the injection mode is switched between a compression-stroke injection mode (late injection mode) and an intake-stroke injection mode (early injection mode), depending on the operating state of the engine, that is, engine load.

When the engine is in low-load operation, for example, therefore, the fuel can be made to be injected during a compression stroke by selecting the compression-stroke injection mode. Accordingly, an air-fuel mixture with an air-fuel ratio near the stoichiometric air-fuel ratio can be formed around the spark plug or in the cavity, so that the fuel can be ignited satisfactorily even with use of a lean overall air-fuel ratio. When the engine is in medium-or high-load operation, on the other hand, the fuel can be made to be injected during an intake stroke by selecting the intake-stroke injection mode. As in the case of a manifold-injection gasoline engine, therefore, the fuel can be burned in plenty by forming an air-fuel mixture with a uniform air-fuel ratio in the combustion chamber, so that an appropriate output can be secured for acceleration or high-speed drive.

The in-cylinder injection gasoline engine of this type, like the manifold-injection gasoline engine, is designed so that the ignition timing is corrected in accordance with its operating state or various operating conditions, such as cooling water temperature, in order to maintain a suitable state of combustion for the fuel.

In the case where the fuel injection mode is the intake-stroke injection mode, the correction of the ignition timing is carried out substantially in the same manner as in the case of the manifold-injection gasoline engine, without any problem.

In the case where the injection mode is the compression-stroke injection mode, however, a spray of the fuel injected into the combustion chamber must be ignited with a timing such that it is collected in the vicinity of the spark plug as the piston ascends, so that a set range for the ignition timing is very narrow. If the ignition timing for the compression-stroke injection mode is corrected in the same manner as that for the intake-stroke injection mode, therefore, ignition may be done when the fuel spray is not properly situated close to the spark plug, so that the combustion state may possibly be worsened. If the correction amount is particularly large, there is a possibility of a misfire taking place. Inevitably, in such a case, the operating state of the engine is not very stable, and the exhaust gas performance is lowered.

SUMMARY OF THE INVENTION

The object of the present invention is to provide a control apparatus for an in-cylinder injection spark-ignition internal combustion engine, capable of continually maintaining a stable state of combustion even in a compression-stroke injection mode such that fuel is injected in a compression stroke.

The above object is achieved by a control apparatus for an in-cylinder injection spark-ignition internal combustion engine according to the present invention. The control apparatus comprises load correlation value calculation means for calculating a load correlation value of the internal combustion engine, ignition timing setting means for setting a reference ignition timing for a spark plug in accordance with a fuel injection mode and the load correlation value, correction means for correcting the reference ignition timing in accordance with an operating state, and correction limiting means for limiting the correction when the fuel injection mode is a compression-stroke injection mode.

Thus, in the case where the fuel injection mode is an intake-stroke injection mode, the reference ignition timing is corrected appropriately in accordance with the operating state of the internal combustion engine, so that the engine operating state is satisfactory. In the case where the injection mode is the compression-stroke injection mode, on the other hand, fuel injected into a combustion chamber must be ignited with a timing such that it is collected properly in the vicinity of the spark plug as a piston ascends, so that a set range for the ignition timing is narrow. By limiting the correction of the reference ignition timing, however, the ignition timing can be suitably kept in the vicinity of the reference ignition timing, and worsening of combustion can be prevented to make the operating state of the engine satisfactory, also in the compression-stroke injection mode. In the case where the internal combustion engine is mounted in a vehicle, in particular, the drivability of the vehicle can be improved.

The correction means includes correction factor calculation means for calculating a correction factor for the reference ignition timing in accordance with the operating state and corrects the reference ignition timing in accordance with the correction factor, and the correction limiting means limits the correction factor to a small value.

Thus, in the case where the fuel injection mode is the intake-stroke injection mode, the reference ignition timing can be easily corrected on the basis of the correction ignition timing correction factor that is calculated in accordance with the operating state. In the compression-stroke injection mode, on the other hand, the correction of the reference ignition timing can be limited by reducing the correction factor, whereby worsening of combustion in the compression-stroke injection mode can be prevented satisfactorily.

Preferably, in this case, the correction factor calculation means calculates a plurality of correction factors in accordance with the operating state, and the correction limiting means limits at least one of the correction factors to a small value.

Thus, in the compression-stroke injection mode, the correction of the reference ignition timing can be limited easily and satisfactorily as a whole by reducing at least one of the correction factors for the correction ignition timing calculated in accordance with the operating state.

Preferably, the correction limiting means prohibits correction based on at least one of the correction factors. Thus, in the compression-stroke injection mode, the correction of the reference ignition timing can be limited easily and satisfactorily as a whole by prohibiting the correction based on at least one of the correction factors.

Further, the correction limiting means may be designed so as to prohibit all the correction when the fuel injection mode is the compression-stroke injection mode. Thus, in the compression-stroke injection mode, the ignition timing can be kept very well in the vicinity of the reference ignition timing, an appropriate ignition timing, so that worsening of combustion in the compression-stroke injection mode can be prevented more satisfactorily.

Preferably, moreover, the control apparatus further comprises injection timing control means for controlling the fuel injection timing of a fuel injection valve, and the correction limiting means permits correction corresponding to a change of the fuel injection timing when the fuel injection timing is changed by the injection timing control means.

Thus, in the compression-stroke injection mode, the correction of the reference ignition timing in accordance with the operating state can be limited satisfactorily, while the ignition timing is suitably corrected corresponding to the change of the fuel injection timing when the injection timing is changed by the correction or the like. In consequence, worsening of combustion in the compression-stroke injection mode can be prevented more satisfactorily without changing the appropriate relation between the ignition timing and the fuel injection timing.

Further scope of applicability of the present invention will become apparent from the detailed description given hereinafter. However, it should be understood that the detailed description and specific example, while indicating preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given byway of illustration only, and thus, are not limitative of the present invention, and wherein.

DETAILED DESCRIPTION OF THE PREFERRED EMBODIMENTS

Preferred embodiments of the present invention will now be described in detail with reference to the accompanying drawings.

Figure 1:
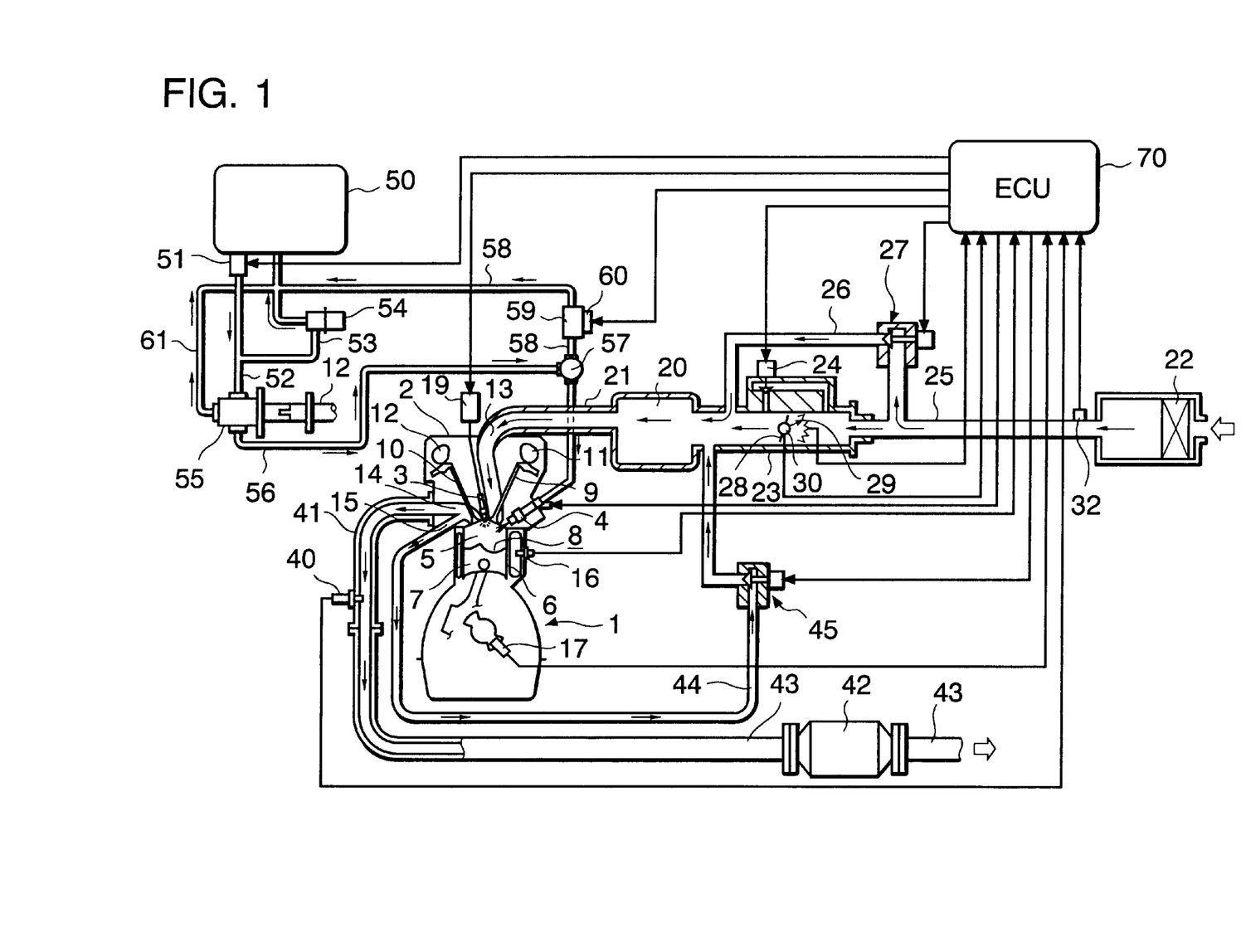
FIG. 1 is a schematic view showing an in-cylinder injection spark-ignition internal combustion engine and a control apparatus therefor.

FIG. 1 is a schematic view showing one embodiment of a control apparatus for an internal combustion engine according to the present invention mounted in a vehicle. Referring now to FIG. 1, an arrangement of the engine control apparatus will be described.

An engine 1 to which the control apparatus is applied is a straight-type in-cylinder injection four-cylindered gasoline engine, which can carry out fuel injection in a compression stroke (late injection mode) as well as fuel injection in an intake stroke (early injection mode), and permits combustion with a lean air-fuel ratio. In this in-cylinder injection engine 1, a combustion chamber, suction system, EGR system (exhaust gas recirculation system) for exhaust gas recirculation, etc. are designed exclusively for in-cylinder injection. According to this arrangement, operation can be easily performed with a rich air-fuel ratio, stoichiometric air-fuel ratio AFS, or lean air-fuel ratio.

A cylinder head 2 of the engine 1 is fitted with a solenoid-operated fuel injection valve 4, as well as a spark plug 3, for each cylinder, whereby a fuel can be injected directly into a combustion chamber 5. A hemispherical hollow or cavity 8 is formed in the top face of a piston 7, which is held for vertical sliding motion a cylinder 6, in a position that is reached by a fuel spray from the fuel injection valve 4 in the latter half of a compression stroke. The compression ratio of this engine 1 is set so as to be higher (e.g., about 12) than that of a manifold fuel injection type. A DOHC four-valve system is used as a valve driving mechanism. An intake-side camshaft 11 and an exhaust-side camshaft 12 are rotatably supported in the upper portion of the cylinder head 2, in order to drive an intake valve 9 and an exhaust valve 10, respectively.

The cylinder head 2 is formed with intake ports 13, which extend substantially upright between the two camshafts 11 and 12, so that intake air currents having passed through the intake ports 13 can generate reverse tumbles, opposite in direction to normal tumbles, in the combustion chamber 5. On the other hand, an exhaust port 14, like that of a conventional engine, extends substantially in the horizontal direction, and a large-diameter exhaust gas recirculation port or EGR port 15 diverges diagonally downward from the port 14.

In FIG. 1, numeral 16 denotes a water temperature sensor for detecting an engine cooling water temperature Tw. Numeral 17 denotes a vane-type crank angle sensor that outputs a crank angle signal $S_{GT}$ in predetermined crank positions (e.g., 5° BTDC and 75° BTDC) for each cylinder. This crank angle sensor 17 can detect an engine speed Ne in accordance with the crank angle signal $S_{GT}$. Numeral 19 denotes an ignition coil that delivers high voltage to the spark plug 3. Each camshaft, which rotates at half the speed of a crankshaft, is fitted with a cylinder discriminating sensor (not shown), which outputs a cylinder discriminating signal $S_{GC}$, whereby the cylinder for which the crank angle signal $S_{GT}$ is outputted can be discriminated.

The intake ports 13 are connected with an intake pipe 25, which is provided with a throttle body 23, a #1 ABV (first air bypass valve) 24 of a stepper-motor type, which functions as intake amount correction means, an airflow sensor 32, and an air cleaner 22, through an intake manifold 21 that has a surge tank 20.

The intake pipe 25 is connected in parallel with a large-diameter air bypass pipe 26 through which intake air is introduced into the intake manifold 21, bypassing the throttle body 23, and this pipe 26 is provided with a large-sized #2 ABV (second air bypass valve) 27 of a linear-solenoid type. The air bypass pipe 26 has a flow area substantially equal to that of the intake pipe 25, and can allow a required amount of intake air for a low or medium speed region of the engine 1 to flow through the pipe 26 when the #2 ABV 27 is fully open.

The throttle body 23 is provided with a butterfly-type throttle valve 28 for opening and closing its passage, and besides, a throttle position sensor (hereinafter referred to as TPS) 29 as a throttle value opening sensor for detecting the opening of the valve 28, that is, a throttle opening θth, and an idle switch 30 for detecting a fully-closed state of the valve 28, thereby detecting an idling state of the engine 1. Actually, a throttle voltage Vth corresponding to the throttle opening θth is delivered from the TPS 29, and the opening θth is recognized by the voltage Vth.

The airflow sensor 32, which is used to detect an intake air amount Qa, is formed of a Karman-vortex airflow sensor, for example. The intake air amount Qa may alternatively be obtained from an intake pipe pressure detected by means of a boost pressure sensor, which is attached to the surge tank 20.

On the other hand, the exhaust port 14 is connected with an exhaust pipe 43, which is provided with a three-way catalyst 42, muffler (not shown), etc., through an exhaust manifold 41, which is fitted with an O2 sensor 40 that can detect an actual air-fuel ratio (actual A/F). Also, the EGR port 15 is connected to the upstream side of the intake manifold 21 through a large-diameter EGR pipe 44 whose line is provided with an EGR valve 45 of a stepper-motor type.

A fuel tank 50 is set in the rear portion of the body (not shown) of the vehicle. The fuel stored in the fuel tank 50 is sucked up by means of a motor-operated low-pressure fuel pump 51, and is supplied to the engine 1 through a low-pressure feed pipe 52. The fuel pressure in the feed pipe 52 is adjusted to a relatively low pressure (low fuel pressure) by means of a first fuel pressure regulator 54, which is inserted in the line of a return pipe 53. The fuel supplied toward the engine 1 is fed into each fuel injection valve 4 through a high-pressure feed pipe 56 and a delivery pipe 57 by means of a high-pressure fuel pump 55, which is attached to the cylinder head 2.

The high-pressure fuel pump 55 is of a swash-plate axial-piston type, for example, and is driven by the exhaust-side camshaft 12 or the intake-side camshaft 11. The pump 55 can produce a discharge pressure of 5 MPa to 7 MPa or more even when the engine 1 is in idle operation. The fuel pressure in the delivery pipe 57 is adjusted to a relatively high pressure (high fuel pressure) by means of a second fuel pressure regulator 59, which is inserted in the line of a return pipe 58.

In FIG. 1, numeral 60 denotes a solenoid-operated fuel pressure selector valve that is attached to the second fuel pressure regulator 59. This fuel pressure selector valve 60 can relieve the fuel to lower the fuel pressure in the delivery pipe 57 to the level of the low fuel pressure when it is on. Further, numeral 61 denotes a return pipe through which some of the fuel is returned to the fuel tank 50 after it is used to lubricate or cool the high-pressure fuel pump 55.

Set in the cabin of the vehicle is an ECU (electronic control unit) 70, which is furnished with an input-output unit, storage unit (ROM, RAM, nonvolatile RAM, etc.) used to store control programs, control maps, etc., central processing unit (CPU), timer counter, etc. General control of the engine 1 is carried out by the ECU 70.

The input side of the ECU 70 is connected with the aforesaid various sensors, and receives detection information from these sensors and the like. Based on these pieces of detection information, the ECU 70 determines a fuel injection quantity, ignition timing, EGR gas introduction rate, etc., as well as a fuel injection mode, and drivingly controls the fuel injection valve 4, ignition coil 19, EGR valve 45, etc. The input side of the ECU 70 is connected with a large number of switches and sensors (not shown and not to be described herein), as well as the aforesaid various sensors. Also, the output side is connected with various warning lamps and devices (not shown).

The following is a description of the operation of the engine control apparatus constructed in the aforementioned manner, that is, the contents of combustion control of the engine 1.

If a vehicle driver turns on the ignition key when the engine 1 is cold, the ECU 70 switches on the low-pressure fuel pump 51 and the fuel pressure selector valve 60, whereupon the fuel injection valves 4 are supplied with the fuel at low fuel pressure.

When the driver turns the ignition key to start operation, the engine 1 is cranked by a self starter (not shown), and at the same time, combustion control is initiated by the ECU 70. At this point of time, the ECU 70 selects an early injection mode (i.e., intake-stroke injection mode), whereupon the fuel is injected so that the air-fuel ratio is relatively rich. At this time of starting, moreover, the ECU 70 closes the #2 ABV 27. In this case, therefore, the suction air is fed into the combustion chamber 5 through a gap of the throttle valve 28 or the #1 ABV 24.

When the engine 1 starts idle operation after its starting is completed, the high-pressure fuel pump 55 initiates a rated discharge operation, so that the ECU 70 turns off the fuel pressure selector valve 60, and supplies the high-pressure fuel to the fuel injection valve 4. In doing this, the required fuel injection quantity is obtained from the discharge pressure of the pump 55 and the valve-opening time of the fuel injection valve 4, that is, fuel injection time.

Until the cooling water temperature Tw reaches a predetermined value, the ECU 70 selects the early injection mode to inject the fuel so as to obtain a rich air-fuel ratio, and continues to keep the #2 ABV 27 closed, just as at the time of the starting. The idle speed control that is based on the variation of the loads of the auxiliaries, such as an air conditioner, is carried out by means of the #1 ABV 24, as in the case of an engine of the manifold fuel injection type.

Thus, when the engine is cold, fuel injection control is effected substantially in the same manner as in the case of the manifold-injection engine.

Figure 2:
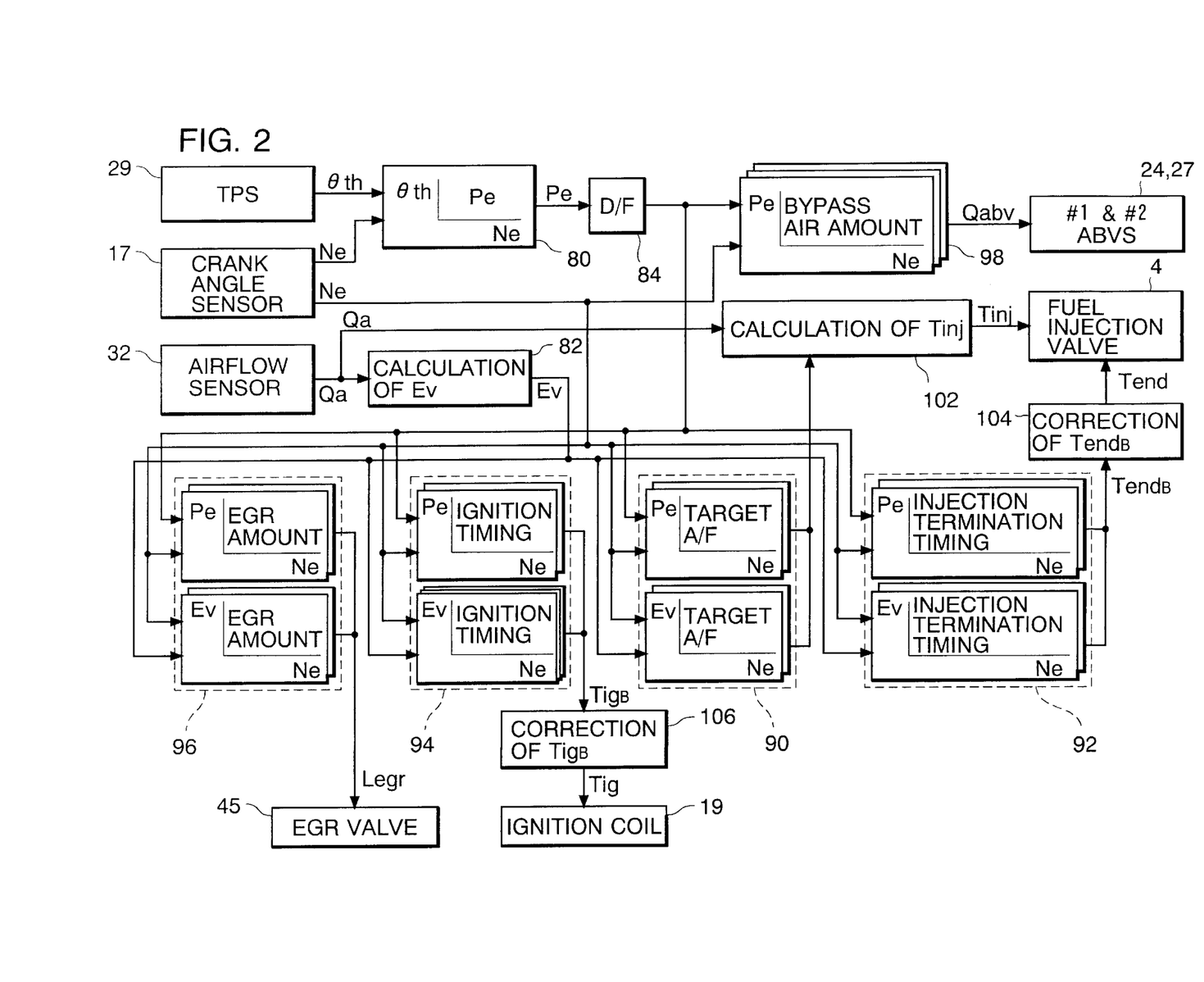
FIG. 2 is a block diagram showing steps of procedure for combustion control executed by an ECU shown in FIG. 1.

FIG. 2 is a block diagram showing steps of procedure for the combustion control executed by the ECU 70 with the engine 1 warmed up. Referring now to FIG. 2, the combustion control for warm-up operation will be described.

When the engine 1 starts the warm-up operation, the ECU 70 reads various detected values, that is, the throttle opening information θth based on the throttle voltage Vth from the TPS 29, the engine speed Ne from the crank angle sensor 17, and the intake air amount information Qa from the airflow sensor 32.

In a Pe calculation unit (first load correlation value calculation unit) 80, a target output, that is, a target mean effective pressure (first load correlation value) Pe, is computed in accordance with the throttle opening information θth based on the throttle voltage Vth from the TPS 29 and the engine speed Ne from the crank angle sensor 17. In practice, a map indicative of the relation between the throttle opening information θth and the engine speed Ne is set in advance, as shown in the block of the Pe calculation unit 80, and the target mean effective pressure Pe is read from this map.

In an Ev calculation unit (second load correlaton value calculation unit) 82, moreover, a volumetric efficiency (second load correlation value) Ev is computed in accordance with the intake air amount information Qa from the airflow sensor 32.

The above first and second load correlation value calculation units constitute load correlation value calculation means. When the target mean effective pressure Pe and the volumetric efficiency Ev are obtained in this manner, signals corresponding to these factors Pe and Ev, besides a signal for the engine speed Ne, are fed to a target A/F computation unit 90, injection termination timing computation unit (injection timing control means) 92, ignition timing computation unit (ignition timing setting means) 94, and EGR amount computation unit 96. These computation units 90, 92, 94 and 96 are blocks for setting various combustion parameters, including a target air-fuel ratio A/F (hereinafter referred to as target A/F), a reference fuel injection termination timing TendB for determining the fuel injection timing, a reference ignition timing TigB, and an EGR amount Legr, respectively.

The target A/F computation unit 90, injection termination timing computation unit 92, ignition timing computation unit 94, and EGR amount computation unit 96 are each provided with a plurality of combustion parameter setting maps based on the engine speed Ne and the target mean effective pressure Pe and combustion parameter setting maps based on the engine speed Ne and the volumetric efficiency Ev.

Figure 3:
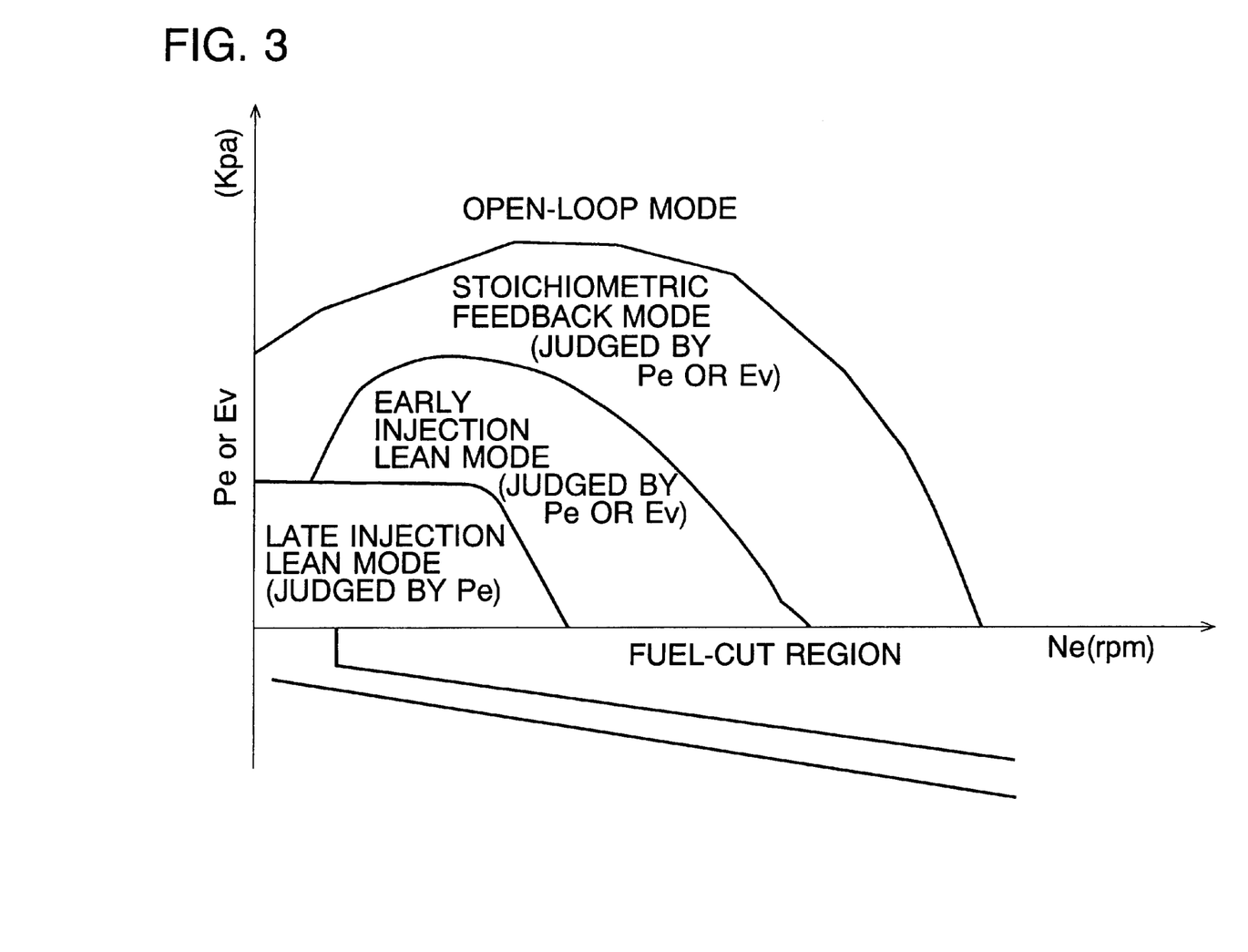
FIG. 3 shows a decision map for fuel injection modes.

More specifically, the target A/F computation unit 90, injection termination timing computation unit 92, and ignition timing computation unit 94 are each provided with maps that are set in accordance with the engine speed Ne and the target mean effective pressure Pe and are used when the fuel injection mode is a late injection lean mode (see FIG. 3) and maps that are set in accordance with the engine speed Ne and the volumetric efficiency Ev and are used when the injection mode is the early injection mode (early injection lean mode, stoichiometric feedback mode, or open-loop mode shown in FIG. 3).

The combustion parameters are set in accordance with the target mean effective pressure Pe when the fuel injection mode is the late injection mode, and are set in accordance with the volumetric efficiency Ev when the injection mode is the early injection mode. This is done because the engine load is correlated much with the target mean effective pressure Pe in the late injection mode where the fuel is injected in the compression stroke, and is correlated much with the volumetric efficiency Ev in the early injection mode where the fuel is injected in an intake stroke.

With respect to the late injection lean mode, maps of two types are provided, one for the case where exhaust gas recirculation (EGR) is effected and the other for the case where EGR is not effected. The same applies to the case of the stoichiometric feedback mode (hereinafter referred to as S-F/B mode) or open-loop mode (hereinafter referred to as O/L mode) for the ignition timing computation unit 94.

The EGR amount computation unit 96 is also provided with maps that are set in accordance with the engine speed Ne and the target mean effective pressure Pe and are used when in the late injection lean mode and maps that are set in accordance with the engine speed Ne and the volumetric efficiency Ev and are used when in the early injection mode. In this unit, maps of two types are provided, one for the case where the transmission (not shown) is adjusted to a neutral range and the other for the case where the transmission is not.

Referring to FIG. 3, there is shown a fuel injection mode setting map provided in the ECU 70. The fuel injection mode is identified as required according to this map. As shown in the map of FIG. 3, the fuel injection mode can be changed depending on the engine speed Ne and the target mean effective pressure Pe or the volumetric efficiency Ev. More specifically, changes between the late injection lean mode and the early injection lean mode and between the late injection lean mode and the S-F/B mode, that is, changes between the late and early injection modes, are carried out in accordance with the engine speed Ne and the target mean effective pressure Pe. On the other hand, changes between the early injection lean mode and the S-F/B mode and between the S-F/B mode and the O/L mode, that is, changes within the early injection mode, are carried out in accordance with the target mean effective pressure Pe or the volumetric efficiency Ev.

If it is concluded with reference to FIG. 3 that the fuel injection mode is the late injection mode, therefore, the maps set in accordance with the engine speed Ne and the target mean effective pressure Pe are selected individually in the respective blocks of the target A/F computation unit 90, injection termination timing computation unit 92, ignition timing computation unit 94, and EGR amount computation unit 96, and the combustion parameters, including the target A/F, reference fuel injection termination timing TendB, reference ignition timing (first reference ignition timing) TigB, and EGR amount Legr, are set. In the late injection mode, as mentioned before, the maps are properly used depending on whether EGR is effected or not.

As shown in FIG. 2, the signal for the target mean effective pressure Pe is also fed to a bypass air amount computation unit 98 through a D/F filter 84. Accordingly, an amount Qabv of bypass air that bypasses the air bypass pipe 26 is also set in accordance with the engine speed Ne and the target mean effective pressure Pe.

If it is concluded with reference to FIG. 3 that the fuel injection mode is the early injection mode, on the other hand, the maps set in accordance with the engine speed Ne and the volumetric efficiency Ev are selected individually in the respective blocks of the target A/F computation unit 90, injection termination timing computation unit 92, ignition timing computation unit 94, and EGR amount computation unit 96, and the combustion parameters, including the target A/F, reference fuel injection termination timing TendB, reference ignition timing (second reference ignition timing)

TigB, and EGR amount Legr, are set. In the early injection mode, as mentioned before, the maps corresponding to the individual modes including the early injection lean mode, S-F/B mode, and O/L mode are selected and applied as required.

When the target A/F, reference fuel injection termination timing TendB, reference ignition timing TigB, EGR amount Legr, and bypass air amount Qabv are set in this manner, a target A/F signal is fed to a Tinj computation unit 102. In this unit 102, a fuel injection time Tinj is set in accordance with the target A/F and the intake air amount Qa. Then, a signal corresponding to the fuel injection time Tinj is fed to the fuel injection valve 4, and the fuel in an amount corresponding to the time Tinj is fed from the valve 4. At the same time, a signal corresponding to the reference fuel injection termination timing TendB is converted into a fuel injection termination timing signal Tend by means of a fuel injection termination timing correction unit 104 and fed to the fuel injection valve 4. The fuel injection timing is settled in accordance with the signal Tend.

The following is a detailed description of the fuel injection termination timing correction unit 104. In this correction unit 104, various corrections of the reference fuel injection termination timing TendB are carried out for each fuel injection mode, depending on the operating state of the engine 1. By doing this, the fuel injection termination timing Tend, that is, the fuel injection timing, is determined finally. The corrections include a water temperature correction based on the cooling water temperature Tw and the like.

Further, a signal corresponding to the reference ignition timing TigB is fed to the ignition coil 19 through an ignition timing correction unit 106. Also in this correction unit 106, various corrections of the reference ignition timing TigB are carried out for each fuel injection mode, depending on the operating state of the engine 1. These corrections include a water temperature correction, intake air temperature correction, idling stabilization correction, retard correction immediately after starting, fuel-cut retard correction, knocking retard correction, acceleration retard correction, etc.

Figure 4:
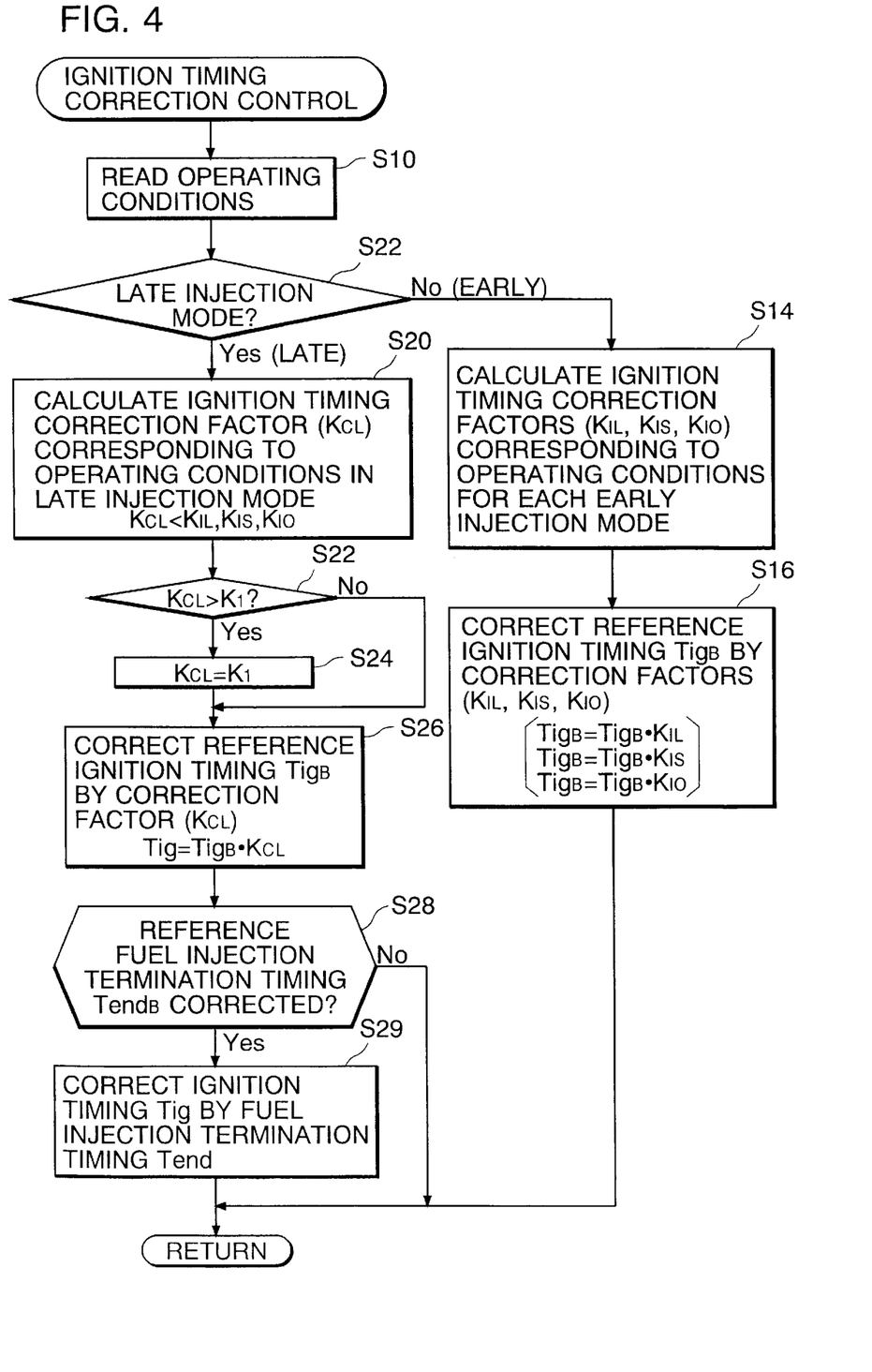
FIG. 4 is a flowchart showing an ignition timing correction control routine.

FIG. 4 is a flowchart showing an ignition timing correction control routine executed in the ignition timing correction unit 106. Referring now to FIG. 4, the contents of ignition timing correction will be described in detail.

In Step S10 of FIG. 4, detections signals (cooling water temperature Tw, engine speed Ne, etc.) from the various sensors are read as various operating conditions, before starting the aforesaid individual corrections.

Then, in Step S12, it is determined whether or not the fuel injection mode is the late injection mode. If the conclusion in this step is No, the fuel injection mode can be concluded to be the early injection mode, and the program then advances to Step S14 (see FIG. 3).

In Step S14, an ignition timing correction factor is calculated for each fuel injection mode according to the various operating conditions. The early injection mode includes the early injection lean mode, S-F/B mode, and O/L mode as fuel injection modes, for each of which the ignition timing correction factor is calculated depending on the operating conditions. In this case, a correction factor $K_{IL}$ for the early injection lean mode, correction factor $K_{IS}$ for the S-F/B mode, and correction factor $K_{IO}$ for the O/L mode are calculated individually.

In this ignition timing correction process, as mentioned before, the individual corrections including the water temperature correction, intake air temperature correction, idling stabilization correction, retard correction immediately after starting, fuel-cut retard correction, knocking retard correction, acceleration retard correction, etc. are carried out. In Step S14, therefore, a correction factor $K_{TW}$ for the water temperature correction, correction factor $K_{TI}$ for the intake air temperature correction, correction factor $K_{IDL}$ for the idling stabilization correction, correction factor $K_{STRT}$ for the retard correction immediately after starting, correction factor $K_{FCT}$ for the fuel-cut retard correction, correction factor $K_{KOC}$ for the knocking retard correction, correction factor $K_{ACC}$ for the acceleration retard correction, etc. are first calculated for each fuel injection mode, depending on the various operating conditions. Then, the correction factors $K_{IL}$, $K_{IS}$, and $K_{IO}$ are obtained by multiplying or adding together the various correction factors $K_{TW}$, $K_{TI}$, $K_{IDL}$, $K_{STRT}$, $K_{FCT}$, $K_{KOC}$, and $K_{ACC}$. Thus, the correction factors $K_{IL}$, $K_{IS}$, and $K_{IO}$ are calculated according to the following equations (1) to (3) (correction factor calculation means), as specific function values (products or sums) of the correction factors $K_{TW}$, $K_{TI}$, $K_{IDL}$, $K_{STRT}$, $K_{FCT}$, $K_{KOC}$, $K_{ACC}$, etc.:

$$K_{IL}=f_{IL}(K_{TW}, K_{TI}, K_{IDL}, K_{STRT}, K_{FCT}, K_{KOC}, K_{ACC}), \quad (1)$$

$$K_{IS}=f_{IS}(K_{TW}, K_{TI}, K_{IDL}, K_{STRT}, K_{FCT}, K_{KOC}, K_{ACC}), \quad (2)$$

$$K_{IO}=f_{IO}(K_{TW}, K_{TI}, K_{IDL}, K_{STRT}, K_{FCT}, K_{KOC}, K_{ACC}). \quad (3)$$

When the correction factors $K_{IL}$, $K_{IS}$, and $K_{IO}$ are thus calculated for each fuel injection mode, the program then advances to Step S16. Thereupon, the reference ignition timing TigB is corrected in accordance with the correction factors $K_{IL}$, $K_{IS}$, and $K_{IO}$, whereby the ignition timing Tig is finally set for each fuel injection mode. In this case, the reference ignition timing TigB is corrected by multiplication according to the following equations (4) to (6) (correction means):

$$Tig=TigB \cdot K_{IL}, \quad (4)$$

$$Tig=TigB \cdot K_{IS}, \quad (5)$$

$$Tig=TigB \cdot K_{IO}. \quad (6)$$

If the conclusion in Step S12 is Yes, that is, if the fuel injection mode is concluded to be the late injection mode, on the other hand, the program then advances to Step S20.

In Step S20, correction factors are obtained in order to correct the reference ignition timing TigB in the same manner as in the case of the early injection mode. Since the late injection mode is limited to the late injection lean mode, a correction factor $K_{CL}$ for the late injection lean mode is obtained in this case.

In this case, just as in the aforesaid case of the early injection mode, the correction factor $K_{TW}$ for the water temperature correction, correction factor $K_{TI}$ for the intake air temperature correction, correction factor $K_{IDL}$ for the idling stabilization correction, correction factor $K_{STRT}$ for the retard correction immediately after starting, correction factor $K_{FCT}$ for the fuel-cut retard correction, correction factor $K_{KOC}$ for the knocking retard correction, orrection factor $K_{ACC}$ for the acceleration retard correction, etc. are first calculated depending on the various operating conditions. Then, the correction factor $K_{CL}$ is obtained by multiplying or adding together the various correction factors $K_{TW}, K_{TI}, K_{IDL}, K_{STRT}, K_{FCT}, K_{KOC}$, and $K_{ACC}$. Thus, as in the aforesaid case, the correction factor $K_{CL}$ is calculated according to the following equation (7), as a specific function value (product or sum) of the correction factors $K_{TW}$, $K_{TI}, K_{IDL}, K_{STRT}, K_{FCT}, K_{KOC}, K_{ACC}$, etc.:

$$K_{CL}=f_{CL}(K_{TW}, K_{TI}, K_{IDL}, K_{STRT}, K_{FCT}, K_{KOC}, K_{ACC}). \quad (7)$$

Normally, in the case where the fuel injection mode is the late injection mode, the fuel is injected into the combustion chamber 5 when the piston 7 is raised close to the top dead point of the compression stroke, as mentioned before. A spray of the fuel is fired and burned when it is collected in the vicinity of the spark plug 3. Thus, in the late injection mode, the fuel injection is carried out only when the piston 7 is in the vicinity of the top dead point of the compression stroke, and satisfactory combustion can be achieved by igniting the fuel with an appropriate timing corresponding to the fuel injection. Normally, therefore, the ignition timing is adjusted to such a timing or MBT (minimum advance for the best torque) as to maintain satisfactory combustion and produce a maximum torque. The MBT is used as the reference ignition timing TigB.

Figure 5:
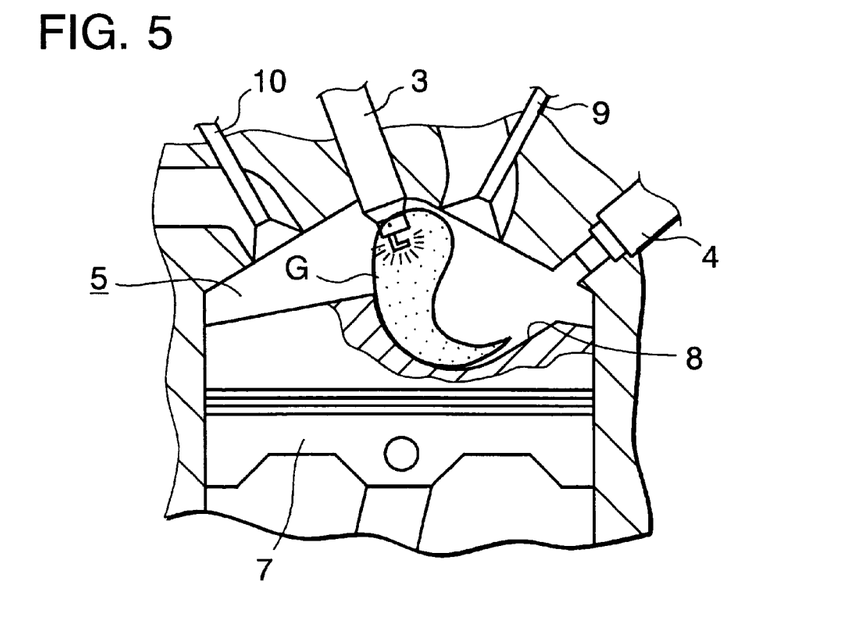
FIG. 5 is a sectional view of an internal combustion engine showing a relation between a fuel spray and ignition established when the ignition timing is adjusted to a reference ignition timing.

Referring to FIG. 5, there is shown a relation between a fuel spray G and ignition by means of the spark plug 3 established when the fuel injection timing is set appropriately for the position of the piston 7 and the ignition timing is the MBT or the reference ignition timing TigB. In this case, as shown in FIG. 5, the fuel spray G flung up along the cavity 8 is caused timely to reach a position near the spark plug 3 with the ignition timing. Thus, the fuel spray G can be fired and burned satisfactorily, and the output torque of the engine 1 can be optimized.

Figure 6:
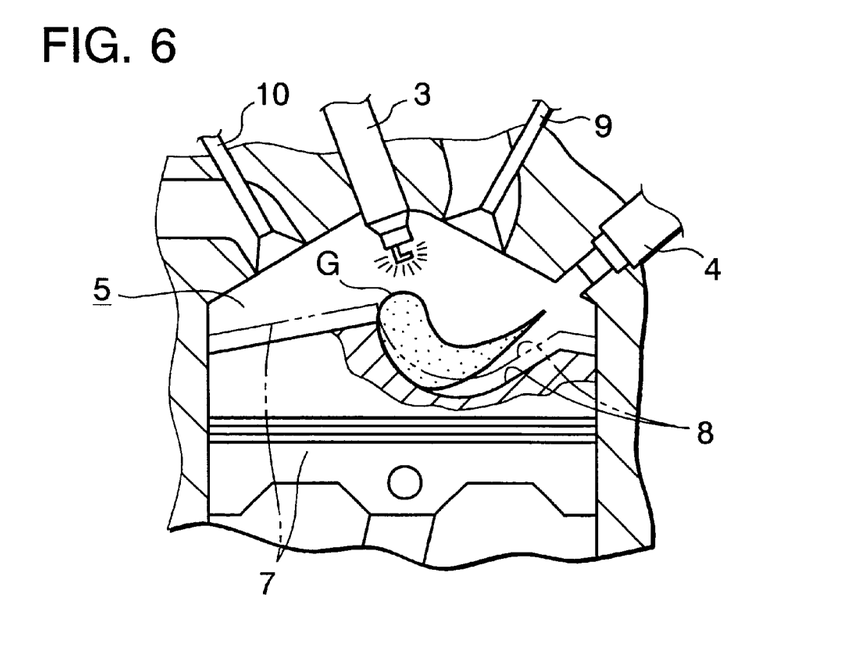
FIG. 6 is a sectional view of the internal combustion engine showing a relation between the fuel spray and ignition established when the ignition timing is advanced as compared to the reference ignition timing.

Referring to FIG. 6, on the other hand, there is shown a relation between the fuel spray G and ignition by means of the spark plug 3 established when only the ignition timing is advanced without changing the fuel injection timing. Thus, if the ignition timing is corrected for advance, depending on the operating conditions of the engine 1 and the like, for example, the fuel spray G is inevitably ignited before it reaches the position near the plug 3, so that it cannot be fired satisfactorily. In this case, therefore, a combustion failure may be caused, possibly resulting in a misfire. In FIG. 6, dashed line indicates the position of the piston 7 at the top dead point of the compression stroke.

Figure 7:
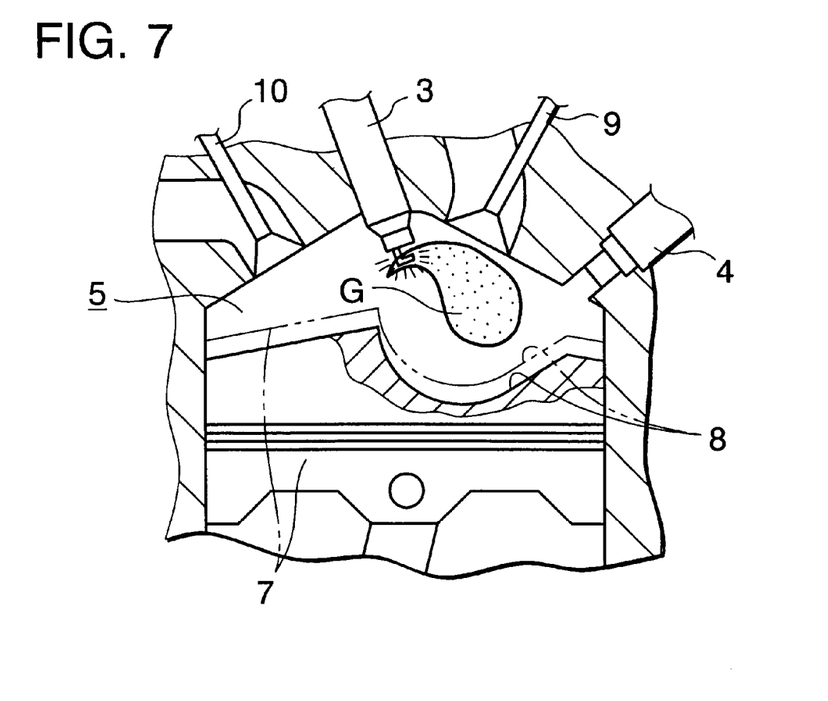
FIG. 7 is a sectional view of the internal combustion engine showing a relation between the fuel spray and ignition established when the ignition timing is retarded as compared to the reference ignition timing.

FIG. 7 shows a relation between the fuel spray G and ignition by means of the spark plug 3 established when only the ignition timing is retarded without changing the fuel injection timing. Thus, if the ignition timing is corrected for retard, depending on the operating conditions of the engine 1 and the like, for example, most of the fuel spray G is inevitably ignited in a position beyond and at a distance from the spark plug 3, so that it cannot be satisfactorily fired either. Also in this case, therefore, a combustion failure may be caused, possibly resulting in a misfire. In FIG. 7, as in FIG. 6, dashed line indicates the position of the piston 7 at the top dead point of the compression stroke.

Accordingly, in the case where the fuel injection mode is the late injection mode, the ignition timing should be set in the vicinity of the reference ignition timing TigB, that is, the MBT. In this case, therefore, the correction factor $K_{CL}$, which is set according to equation (7), is restricted to a value smaller enough than the correction factors $K_{IL}$, $K_{IS}$, and $K_{IO}$ for the early injection mode ($K_{CL} < K_{IL}$, $K_{IS}$, $K_{IO}$). Thus, when the fuel injection mode is the late injection mode, the ignition timing can be satisfactorily corrected only within a narrow range near the reference ignition timing TigB (correction limiting means).

Although the correction factor $K_{CL}$ is restricted to a small value according to equation (7), at least one of the various correction factors $K_{TW}$, $K_{TP}$, $K_{IDL}$, $K_{STRT}$, $K_{FCT}$, $K_{KOC}$, and $K_{ACC}$ may alternatively be set at a small value, or correction based on at least one of the correction factors may be prohibited. It is more effective to limit a correction factor for a particularly large correction amount. Thus, the correction factor $K_{CL}$ can be restricted to a small value in the same manner as in the case where equation (7) is used.

In Step S22, it is determined whether or not the correction factor $K_{CL}$ thus set at the small value is greater than a given value. If the conclusion in this step is Yes, that is, if the correction factor $K_{CL}$ is concluded to be greater than the given value K1, the program then advances to Step S24, whereupon the correction factor $K_{CL}$ is adjusted to the given value K1. In other words, the correction factor $K_{CL}$ set at the small value is further given a clip value (given value K1, i.e. correction limit value) such that the reference ignition timing TigB cannot be corrected too much (correction limiting means). Thus, occurrence of a misfire can be prevented securely.

When Step S24 is executed, the program then advances to Step S26. If the conclusion in Step S22 is No, that is, if the correction factor $K_{CL}$ is concluded to be not greater than the given value K1, the program also advances directly to Step S26.

In Step S26, the ignition timing is corrected in accordance with the correction factor $K_{CL}$ obtained in the aforesaid manner, and the ignition timing Tig is finally obtained according to the following equation (8):

$$Tig = TigB \cdot K_{CL}. \tag{8}$$

If the cooling water temperature Tw is so low that the engine 1 is at a relatively low temperature even during the warm-up operation, the fuel injection timing is expected to be corrected. If the injection timing is corrected in the aforesaid manner, however, it is inevitably deviated from the ignition timing Tig. If the relation between the ignition timing Tig and the fuel injection timing or the fuel injection termination timing Tend is thus changed, a satisfactory state of combustion cannot be maintained any longer.

In Step S28, therefore, the reference fuel injection termination timing TendB is corrected in the fuel injection termination timing correction unit 104, whereupon it is determined whether or not the fuel injection timing is changed. If the conclusion in Step S28 is Yes, that is, if the fuel injection timing is concluded to have been changed, the ignition timing Tig is corrected appropriately in accordance with a correction amount for the reference fuel injection termination timing TendB in Step S29.

Figure 8:
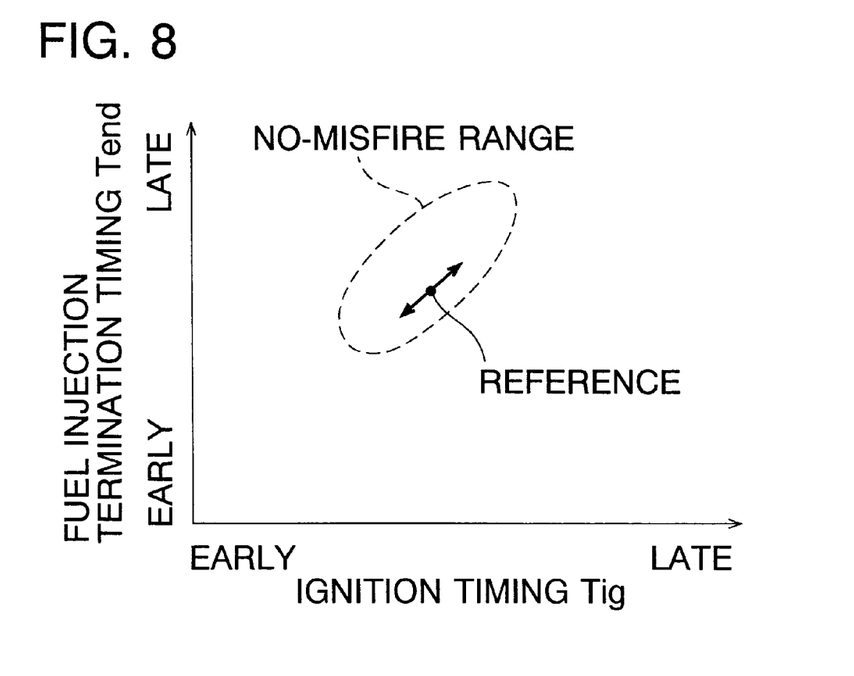
FIG. 8 is a graph showing the relation between the ignition timing and a fuel injection termination timing.

Referring to FIG. 8, there is shown a relation between the fuel injection termination timing Tend and the ignition timing Tig. In FIG. 8, a broken-line circle around a point (reference) for the reference ignition timing TigB surrounds and indicates the reference ignition timing TigB and an allowable range for the ignition timing Tig compared to the fuel injection termination timing Tend.

Thus, in the case where the reference fuel injection termination timing TendB is corrected, it is necessary only that the ignition timing Tig be set within the range surrounded by the broken-line circle shown in FIG. 8. Preferably, the ignition timing Tig and the fuel injection timing or the fuel injection termination timing Tend should be set in a substantially fixed interval, as mentioned before.

In Step S29, therefore, the ignition timing Tig is corrected in the direction indicated by the arrow in FIG. 8 in accordance with the correction amount for the reference fuel injection termination timing TendB so that the relation between the timing tendB and the ignition timing Tig is substantially fixed. By doing this, the interval between the fuel injection timing and the ignition timing can be kept in a substantially constant relation, and the satisfactory operating state of the engine 1 can be maintained.

When the reference ignition timing TigB is corrected in accordance with the correction factor $K_{CL}$, the ignition timing Tig, compared with the fuel injection termination timing Tend, is already deviated from the reference point in FIG. 8. Even in this case, however, the ignition timing Tig compared with the fuel injection termination timing Tend can be satisfactorily corrected along the arrow in FIG. 8 so as not to be deviated from the range surrounded by the broken-line circle.

When the ignition timing Tig is thus set as the reference ignition timing TigB is corrected in the ignition timing correction unit 106, a signal for the ignition timing Tig is fed to the ignition coil 19, whereupon the fuel is ignited by the spark plug 3.

Also, a signal for the EGR amount Legr is fed to the EGR valve 45, and a signal for the bypass air amount Qabv is fed to the #1 and #2 ABVs, whereby optimum combustion control can be carried out.

When the engine 1 is operated in a low-load region, as in the case of idle operation or low-speed drive, for example, the late injection lean mode shown in FIG. 3 is established as the fuel injection mode, and the fuel injection is carried out in the compression stroke. Further, the fuel injection quantity is determined so as to obtain a lean target A/F (e.g., A/F=about 30 to 40) based on the target mean effective pressure Pe, and the reference fuel injection termination timing TendB, reference ignition timing TigB, and EGR amount Legr are also set in accordance with the target mean effective pressure Pe.

In this case, the reference fuel injection termination timing TendB is finally corrected into the fuel injection termination timing Tend by means of the fuel injection termination timing correction unit 104 shown in FIG. 2, and the reference ignition timing TigB is also finally corrected into the ignition timing Tig by means of the ignition timing correction unit 106 shown in FIG. 2. As mentioned before, however, the correction of the reference ignition timing TigB is originally more limited than the correction for the early injection mode (see Step S20 of FIG. 4), and besides, is restricted by the clip value (K1) (see Steps S22 and S24 of FIG. 4). When the reference fuel injection termination timing TendB is corrected, moreover, the ignition timing Tig is also corrected correspondingly. Thus, in the late injection mode, a good relation can always be maintained between the fuel injection termination timing Tend and the ignition timing Tig. Even though the air-fuel ratio is lean as a whole, therefore, satisfactory ignitability can be ensured, and the operating state of the engine 1 can be suitably maintained without causing a misfire.

When the engine is operated in a medium-load region, as in the case of constant-speed drive, for example, the early injection mode, that is, the early injection lean mode or the S-F/B mode shown in FIG. 3, is established as the fuel injection mode. In the early injection lean mode, the fuel injection is carried out in the intake stroke, and the fuel injection quantity is determined so as to obtain a relatively lean target A/F (e.g., A/F=about 20 to 23) based on the volumetric efficiency Ev. In the S-F/B mode, the fuel injection is also carried out in the intake stroke, and air-fuel ratio feedback control is effected in accordance with an output voltage from the O2 sensor 40, and the target A/F is controlled so as to be a stoichiometric air-fuel ratio AFS. The reference fuel injection termination timing TendB and the reference ignition timing TigB are set in accordance with the volumetric efficiency Ev.

In this case, as in the case of the late injection mode, the reference fuel injection termination timing TendB is finally corrected into the fuel injection termination timing Tend by means of the fuel injection termination timing correction unit 104 shown in FIG. 2, and the reference ignition timing TigB is also finally corrected into the ignition timing Tig by means of the ignition timing correction unit 106 shown in FIG. 2. In this case, there is no such restriction as is required in the late injection mode, and the reference fuel injection termination timing TendB and the reference ignition timing Tig are corrected freely and independently of each other. Thus, the reference fuel injection termination timing TendB is corrected for each fuel injection mode into the fuel injection termination timing Tend in accordance with the cooling water temperature Tw and the like. On the other hand, the reference ignition timing TigB is suitably corrected also for each fuel injection mode into the ignition timing Tig in accordance with the correction factors $K_{IL}$ and $K_{IS}$. Thus, in the early injection mode, as in the case of the conventional manifold-injection internal combustion engine, the fuel injection termination timing Tend and the ignition timing Tig are subjected to variable control for satisfactory combustion control, depending on the operating state of the engine 1. In this manner, the operating state of the engine 1 can be maintained appropriately without involving worsening of combustion.

Figure 9:
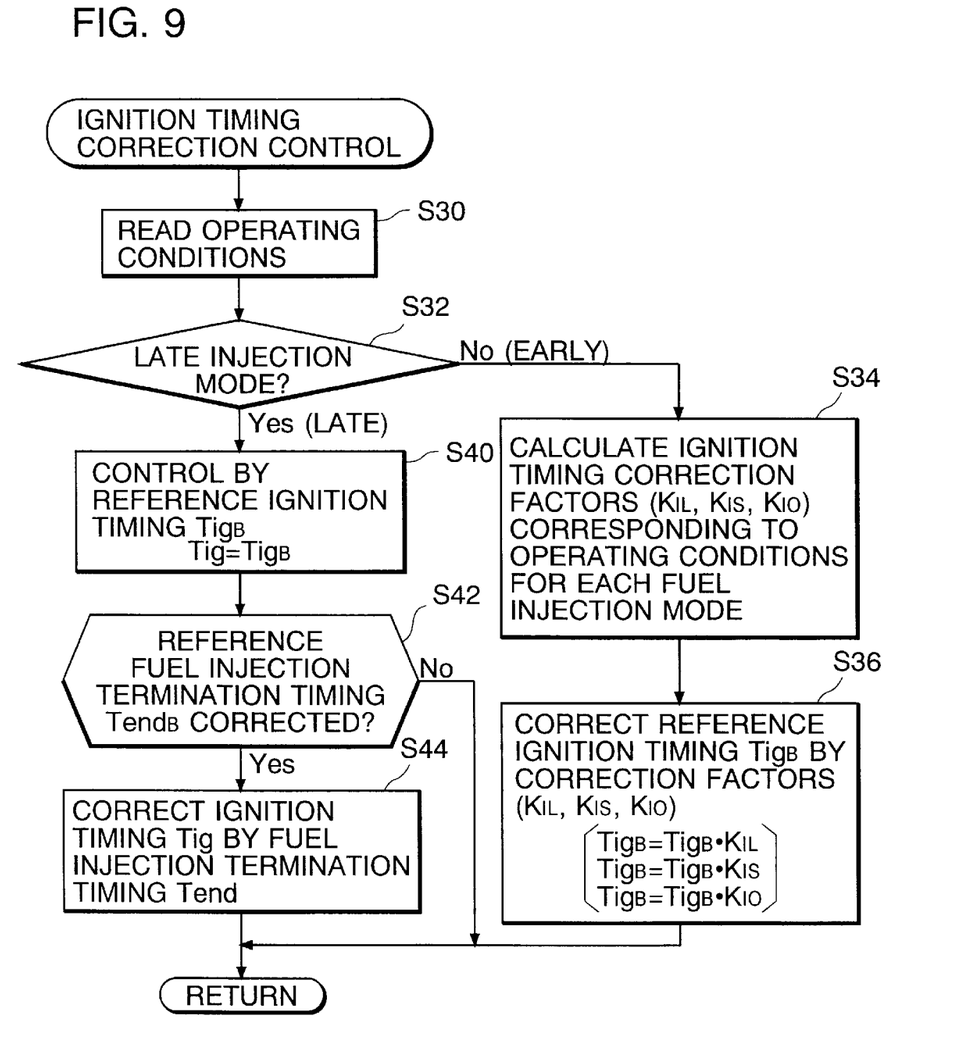
FIG. 9 is another flowchart showing an ignition timing correction control routine according to another embodiment of the invention.

FIG. 9 is a flowchart showing another ignition timing correction control routine executed in the ignition timing correction unit 106. Referring now to FIG. 9, ignition timing correction according to another embodiment of the present invention will be described.

Since Steps S30 to S36 of FIG. 9 are identical with Steps S10 to S16 of FIG. 4, respectively, a description of those steps is omitted.

If the conclusion in Step S32 is Yes, that is, if the fuel injection mode is concluded to be the late injection mode, the program then advances to Step S40.

In Step S40, which has no equivalent in the control routine of FIG. 4, the reference ignition timing TigB is used directly as the ignition timing Tig according to the following equation (9) without being corrected at all;

$$Tig=TigB. \qquad (9)$$

Thus, in the case where the fuel injection mode is the late injection mode, the ignition timing Tig can be more securely kept at a value near the reference ignition timing TigB or the MBT, by prohibiting any correction of the reference ignition timing TigB. By doing this, the load on the ECU 70 can be reduced without making any computation for the correction of the reference ignition timing TigB. Thus, a misfire can be prevented, and the operating state of the engine 1 can be maintained satisfactorily.

If the reference fuel injection termination timing TendB is corrected (Step S42) when the cooling water temperature Tw is so low that the engine 1 is at a relatively low temperature even during the warm-up operation, the ignition timing Tig is corrected appropriately (Step S44) in accordance with the correction amount for the reference fuel injection termination timing TendB, that is, the fuel injection timing, in the same manner as in the case of FIG. 4.

In the control apparatus for the in-cylinder injection spark-ignition internal combustion engine according to the present invention, as described in detail herein, the correction of the reference ignition timing TigB, along with the correction of the reference fuel injection termination timing TendB, is carried out independently and freely, depending on the operating state of the engine 1, when the fuel injection mode is the intake-stroke injection mode, that is, the early injection mode. When the fuel injection mode is the compression-stroke injection mode, that is, the late injection mode, on the other hand, the ignition timing Tig is obtained by limiting the correction of the correction of the reference ignition timing TigB, or the correction is entirely prohibited so that the ignition timing Tig is kept at the value of the reference ignition timing TigB. In the case where the reference fuel injection termination timing TendB is corrected, moreover, the ignition timing Tig is suitably corrected in accordance with the correction amount for the termination timing TendB.

When the fuel injection mode is the early injection mode, therefore, the combustion state can always be kept satisfactory by suitably correcting the reference ignition timing TigB along with the reference fuel injection termination timing TendB, depending on the operating state. When the fuel injection mode is the late injection mode, on the other hand, the ignition timing Tig can be maximally restrained from being deviated from a value near the reference ignition timing TigB or the MBT. In the case where the fuel injection termination timing Tend is corrected, the relation between the ignition timing Tig and the termination timing Tend or the fuel injection timing can always be kept substantially constant, so that a misfire and worsening of combustion can be prevented appropriately. Thus, according to the control apparatus for the in-cylinder injection spark-ignition internal combustion engine of the invention, the combustion state can always be kept satisfactory without regard to the fuel injection mode, whether early or late, and the engine 1 can be kept in an appropriate operating state.

What is claimed is:

1. A control apparatus for an in-cylinder injection spark-ignition internal combustion engine, the engine including a fuel injection valve for injecting a fuel directly into a combustion chamber and a spark plug for subjecting the fuel to spark ignition in the combustion chamber, the fuel injection valve being controlled in either an intake-stroke injection mode where the fuel is injected mainly in an intake stroke or a compression-stroke injection mode where the fuel is injected mainly in a compression stroke, the control apparatus comprising:

operating state detection means for detecting an operating state of the internal combustion engine;

injection mode selection means for selecting the intake-stroke injection mode or the compression-stroke injection mode in accordance with the operating state detected by the operating state detection means;

load correlation value calculation means for calculating a load correlation value of the internal combustion engine;

ignition timing setting means for setting a reference ignition timing for the spark plug in accordance with the injection mode and the load correlation value;

correction means for correcting the reference ignition timing in accordance with the operating state; and correction limiting means for limiting the correction when the compression-stroke injection mode is selected by the injection mode selection means.

2. The apparatus according to claim 1, wherein said correction means includes correction factor calculation means for calculating a correction factor for the reference ignition timing in accordance with the operating state and corrects the reference ignition timing in accordance with the correction factor, and said correction limiting means limits the correction factor to a small value.

3. The apparatus according to claim 2, wherein said correction factor calculation means calculates a plurality of correction factors in accordance with the operating state, and said correction limiting means limits at least one of the correction factors to a small value.

4. The apparatus according to claim 3, wherein said correction limiting means prohibits correction based on at least one of the correction factors.

5. The apparatus according to claim 1, wherein said correction limiting means prohibits the correction when the compression-stroke injection mode is selected by the injection mode selection means.

6. The apparatus according to claim 1, which further comprises injection timing control means for controlling the fuel injection timing of the fuel injection valve, and said correction limiting means permits correction corresponding to a change of the fuel injection timing when the fuel injection timing is changed by the injection timing control means.

7. The apparatus according to claim 1, wherein said load correlation value calculation means includes a first load correlation value calculation unit for calculating a first load correlation value and a second load correlation value calculation unit for calculating a second load correlation value, said ignition timing setting means sets a first reference ignition timing in accordance with the first load correlation value when the compression-stroke injection mode is selected by said injection mode selection means, and sets a second reference ignition timing in accordance with the second load correlation value when the intake-stroke injection mode is selected by said injection mode selection means, and said correction limiting means limits the correction of the first reference ignition timing.

8. The apparatus according to claim 2, wherein said correction limiting means limits the correction factor calculated by said correction factor calculation means such that the cacculated correction factor does not exceed a preset correction limit value.

* * * * *